March 22, 1927.  
D. V. EDWARDS  
CASING FOR ELECTRICAL APPARATUS  
Filed Dec. 7, 1922  
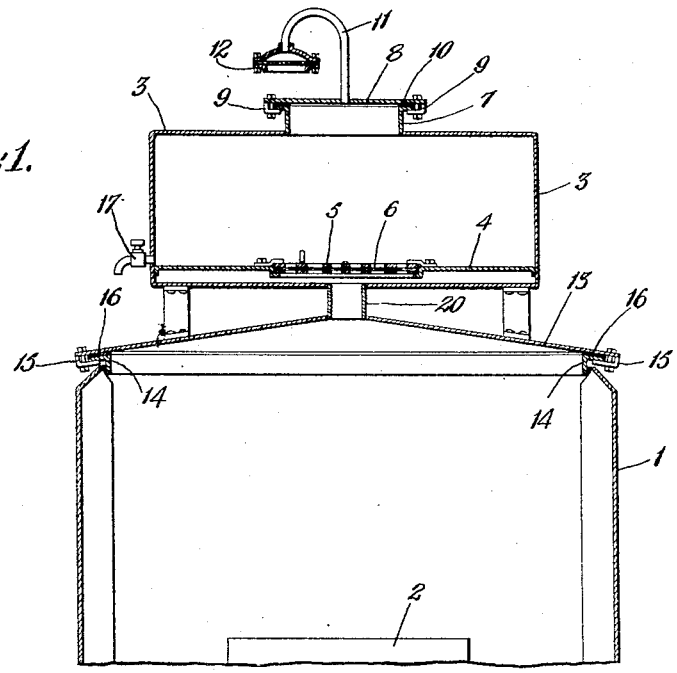
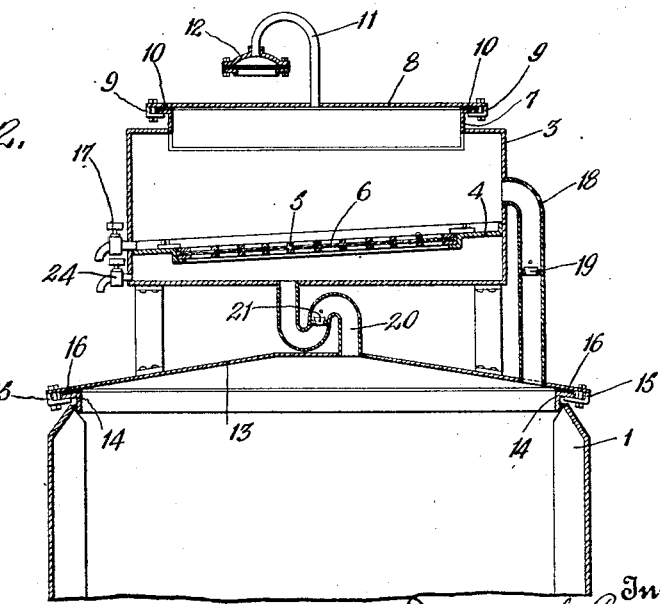

March 22, 1927.
D. V. EDWARDS
1,622,030
CASING FOR ELECTRICAL APPARATUS
Filed Dec. 7, 1922    2 Sheets-Sheet 2
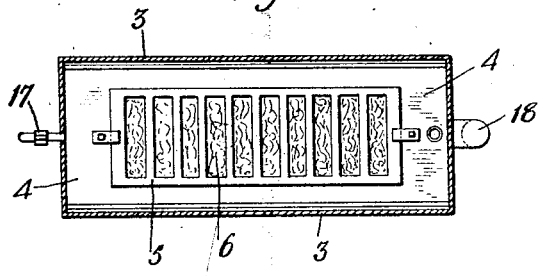
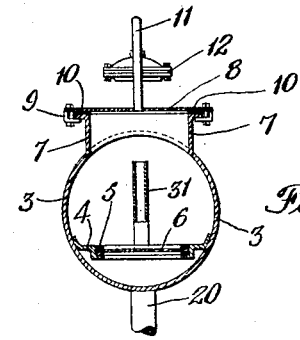
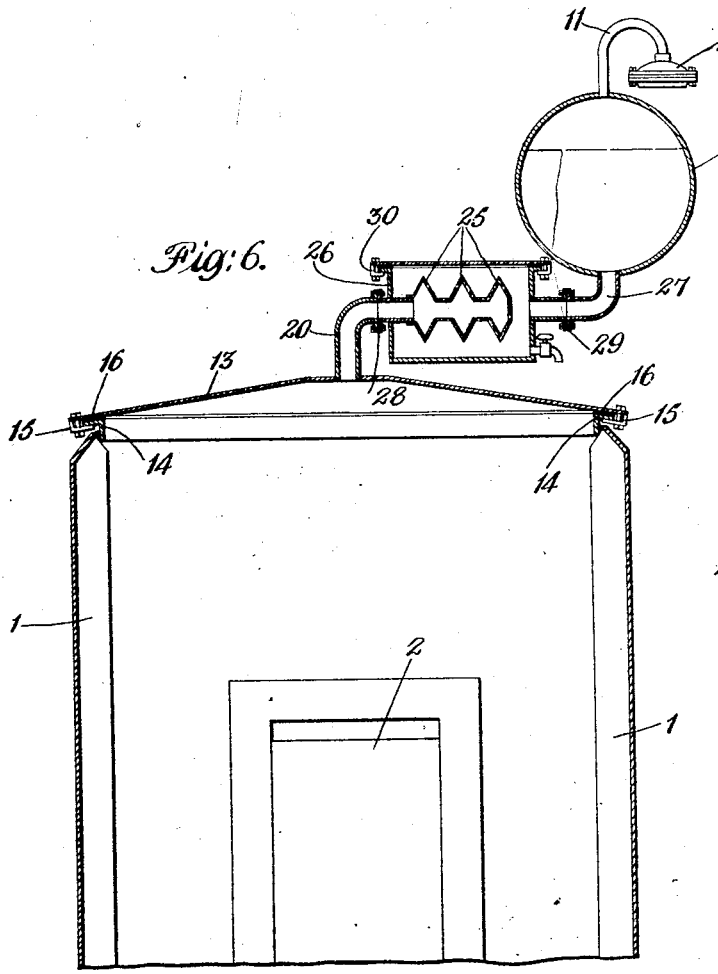
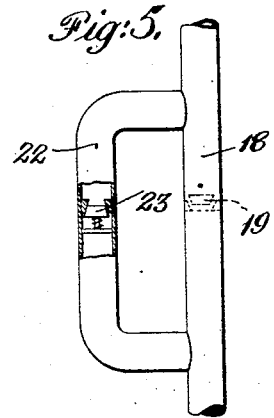

Patented Mar. 22, 1927.

1,622,030

UNITED STATES PATENT OFFICE.

DONALD V. EDWARDS, OF TROY, NEW YORK, ASSIGNOR TO PITTSBURGH TRANSFORMER COMPANY, A CORPORATION OF PENNSYLVANIA.

CASING FOR ELECTRICAL APPARATUS.

Application filed December 7, 1922. Serial No. 605,529.

This invention relates to oil-containing casings for apparatus, such as electrical transformers, switches or the like, which generate heat, the apparatus being immersed in the oil which circulates and carries away the heat by conduction to the walls of the casing and radiation therefrom.

In apparatus of this character it is sometimes desirable to provide a separate expansion tank into which the heated oil may expand, subsequently to cool and return to the main tank. The expansion of the oil into the expansion tank expels air therefrom to the atmosphere, and the cooling and consequent return of the oil to the main tank sucks fresh air into the expansion tank. To prevent such moisture as may be drawn into the expansion tank from the atmosphere in this manner from reaching the main tank, it has been proposed heretofore to provide a sump between the expansion tank and the main tank in order that such moisture may collect therein and be drawn off. Obviously such means can only be relied upon to remove such free water as may collect in the sump in a limited time and be observed by an operator and drawn off by him. Such free water, however, is not as dangerous as is moisture intermixed with oil, because the free water, even if returned to the main tank would fall to the bottom of the tank, whereas moisture intermixed with the oil may return with the oil to the main tank and there circulate into contact with the windings of the transformer or other parts carrying high tension current.

It is the purpose of my invention to provide means whereby the oil returned to the main tank from the expansion tank will be freed from any moisture automatically and certainly.

The invention will be more fully described with reference to the accompanying drawings in which Fig. 1 is a longitudinal sectional view of an apparatus embodying the invention.

Fig. 2 is a longitudinal sectional view of a modification thereof.

Fig. 3 is a top sectional view of the expansion tank shown in Fig. 2.

Fig. 4 is an end section of the same, and also showing an optional addition of a relief pipe.

Fig. 5 is a detail view of a modified form of connecting pipe.

Fig. 6 is a sectional view of a further modified form of the invention.

Referring to Fig. 1 of the drawings, 1 represents the main tank containing the transformer 2 or other apparatus. The expansion tank 3, is suitably supported above the main tank and is divided by a diaphragm 4, provided with an opening in which is placed a filter which preferably comprises perforated supporting plates 6, between which one or more layers of moisture absorbent filter paper, fibrous material or other substance adapted to absorb moisture from the oil, are supported. Preferably also the plates and filter substance are removable as a unit from the diaphragm 4. To this end a manhole 7 is provided above the filter, and a cover plate 8 is clamped to the manhole flange by clamps 9, a gasket 10 being interposed between the cover plate and the manhole flange. A breather device comprising a pipe 11 leads from the cover 8 to the breather 12 which comprises a suitable area of filter paper clamped between two flanges and open to the atmosphere. Air may thus enter the tank 3 by passing through the filter paper in breather 12, and thence through pipe 11 into the tank.

The main tank 1 is filled with oil and its cover 13 is clamped to top flanges 14 on the tank by means of clamps 15, a suitable gasket 16 being interposed between the cover and the top flange in order to secure an oil and air-tight closure.

In operation, the heat from the transformer 2, or other apparatus, causes the oil to expand through the pipe 20 into the lower part of tank 3 and thence upward through the filter plate and filter paper 5, 6, into the upper part of the tank 3. Such air as may be in the top of tank 3 passes out through the breather 12, thereby warming the filter paper or absorbent substance therein and tending to free it from any previously absorbed moisture. When the apparatus cools and the oil contracts, it will be drawn from the upper part of the tank through the filter 5, 6, back into the main tank. It cannot return to the main tank except by passing through the filter. During this period air may enter from the atmosphere through the breather 12, and pipe 11 into the upper part of tank 3. Any moisture that may have entered the oil, either in the form of condensed water or intermingled with the oil, will be absorbed by the filter and abstracted from the oil. The return of the oil to the main tank is through the filter aided by the fact that the upper surface of the oil in tank 3 is under atmospheric pressure and the main tank is air-tight. A suction will therefore be exerted tending to draw the oil through the filter back into the main tank. At suitable intervals the filter may be renewed. If desired, a cock 17, may be located immediately above the diaphragm 4 in order to draw off any free water that may collect above the diaphragm.

In the modification shown in Fig. 2, the oil is caused to pass through the filter in one direction only, and the flow through the filter will be by gravity, aided by the suction. The oil flows from the main tank 1 into the upper part of tank 3 by means of a pipe 18, provided with a check valve 19, which permits passage of the oil from the main tank to the upper part of tank 3 only. The diaphragm 4 carrying the filter will be so located in the tank as to give the desired storage capacity in the respective compartments and the desired filter area. A pipe 20 leads from the lower part of tank 3 to the main tank 1 and is provided with a check valve 21 which permits passage of oil from the lower part of the expansion tank to the main tank only. If desired, in order to guard against the possibility of the filter 5, 6 being neglected to such an extent that the filter becomes clogged, the pipe 18 may be provided with a by-pass 22, provided with a relief valve 23 which permits flow from the upper part of the expansion tank to the main tank upon the occurrence of a predetermined abnormal pressure, the valve 23 being made adjustable for this purpose. If desired cocks 17 and 24 may be provided in order to drain oil or water from the lower part of each of the compartments of expansion tank 3. To this end, if desired, the diaphragm may be inclined as indicated in Fig. 2 of the drawings. The area of the filter and the capacity of the lower part of the expansion tank will be regulated according to the desired operation. The area should be large enough to pass the oil at the desired rate, and if the gravity of the oil alone is depended upon, the area should be larger than if the flow is aided by the suction of the main tank. Preferably the capacity of the lower compartment should be such that the normal oil level is above the filter. In such case the oil flows from the main tank 1 to the upper compartment of the expansion tank and from there is drawn down by suction through the filter and pipe 20 into the main tank. If the capacity of the lower compartment and the normal level of the oil therein is such that the volume of oil therein when the tank is cool is equal to the volume of oil expelled from the main tank under heat no harm to the apparatus will occur even if the filter should become clogged, because in that event the oil from the lower compartment will flow into and fill the main tank. If the diaphragm 4 is so located that the flow of oil through the filter is by gravity it may be desirable in some cases to provide a relief pipe 31, shown in Fig. 4 to prevent the trapping of air in the compartment below the filter and consequent opposition to oil flow therethrough.

A further modification is shown in Fig. 6 in which the form of filter shown is one having vertically inclined filter plates, thereby aiding to some extent the draining of the filter. In this case the pipe 20 leads into a filter composed of filter paper or other suitable moisture absorptive filter material in the form of hollow projections 25, 25, 25 communicating with pipe 20 and closed at the end. The filter is contained in a chest 26 from which a pipe 27 leads to the expansion tank 3 which in this instance is not provided with a diaphragm. In order to easily remove the chest 26 and the filter contained therein, the pipes 20 and 27 are respectively flanged as shown at 28, 29, and the sections thereof bolted together. The chest 26 may also, if desired, be provided with a removable cover clamped to the chest by means of clamping bolts 30. In this construction the heated oil passes through pipe 20 into the interior of the filter 25, and after passing through the filter collects in the chest 26 and thence passes through pipe 27 into the expansion tank 3, the air being expelled therefrom through the breather 12. When the oil cools it is sucked from tank 3 through the filter 25 and pipe 20 into the main tank 1.

The capacity of the filter to absorb moisture may of course be governed by the thickness or bulk of the filter, and this will usually be adjusted according to the average moisture content of the oil in the tank so that under given conditions of operation the filter will absorb more moisture than could be taken in by the oil over an extended period of operation.

Having thus described my invention, I declare that what I claim is new and desire to secure by Letters Patent is:

1. The combination with a main tank containing electrical apparatus and oil heated thereby, of an expansion tank communicating with said main tank to receive the overflow therefrom, a diaphragm dividing said expansion tank into two compartments, a filter in said diaphragm between said compartments, a pipe permitting a flow of oil from the main tank to the upper part of the expansion tank, and a pipe permitting the flow of oil from the lower part of the expansion tank to the main tank.

2. The combination with a tank containing electrical apparatus and oil heated thereby, of a separate expansion tank communicating with said main tank to receive the overflow of oil therefrom, means within the expansion tank for abstracting moisture from the oil, and means for preventing the return of oil from the expansion tank to the main tank except through said moisture abstracting means.

3. The combination with a main tank containing electrical apparatus and oil heated thereby, of a separate expansion tank communicating with said main tank to receive the overflow of oil therefrom, and means within the expansion tank for automatically abstracting moisture from the oil only during its return from the expansion tank to the main tank comprising a filter.

4. The combination with a main tank containing electrical apparatus and oil heated thereby, of an expansion tank in communication with said main tank to receive the overflow of oil therefrom, means within the expansion tank for abstracting moisture from the oil, means for permitting the flow from the expansion tank to the main tank only through the moisture abstracting means, and means for permitting the flow of oil from the main tank to the expansion tank without passing through said moisture abstracting means.

5. The combination with a main tank containing electrical apparatus and oil heated thereby, of a separate expansion tank communicating with said main tank to receive the overflow of oil therefrom, an oil passage connecting the tanks, a second oil passage between the tanks and a moisture absorbing device located within the expansion tank.

6. The combination with a main tank containing oil, of an expansion tank communicating therewith, and an inclined diaphragm of moisture abstracting material in the path of the oil and adapted to abstract moisture and divert it to a sump.

7. The combination with a main tank containing oil, of an expansion tank communicating therewith, and an inclined diaphragm of moisture abstracting material in the path of the oil and adapted to abstract moisture and divert it to a sump in said expansion tank.

8. The combination with a main tank containing electrical apparatus and oil heated thereby, of an expansion tank communicating with the main tank to receive the overflow of oil therefrom, and a diaphragm of sheet material in the path of the oil flowing between the said tanks and adapted to abstract moisture from said oil and permit the moisture to drain off by gravity into a sump.

9. The combination with a main tank containing electrical apparatus and oil heated thereby, of an expansion tank communicating with the main tank to receive the overflow of oil therefrom, and a diaphragm containing absorbent sheet material in the path of the oil flowing between the said tanks and adapted to abstract moisture from said oil and permit the moisture to drain off by gravity into a sump.

10. The combination with a main tank containing electrical apparatus and oil heated thereby, of an expansion tank communicating with said main tank and adapted to receive the overflow of oil therefrom, means forming two separate oil passages between the upper portion of said main tank and expansion tank, means preventing the flow of oil from the main tank to the expansion tank through one of said passages, means preventing the flow of oil from the expansion tank to the main tank through the other of said passages and a filter carried by an inclined diaphragm within the expansion tank and in the path of oil through said passages.

11. The combination with a tank adapted to contain oil, a circulating system for said oil, a filter in the path of oil through said system and means forming a sump adjacent to said filter, said filter being formed with an inclined surface for draining water away from said filter into said sump.

12. The combination with a tank adapted to contain oil, a circulating system for said oil, a filter in the path of oil through said system, means forming a sump adjacent to said filter, said filter being formed so as to drain water into said sump and means for removing water from said sump.

13. The combination with a main tank containing electrical apparatus and oil heated thereby, of an expansion tank communicating with said main tank to receive the overflow of oil therefrom, and formed with an opening, a cover for said opening, a diaphragm dividing said expansion tank into two compartments in said expansion tank, a filtering device carried by said diaphragm between said compartments, said filtering device being removable through said opening.

DONALD V. EDWARDS.